(12) United States Patent
Acharya et al.

(10) Patent No.: US 7,349,349 B2
(45) Date of Patent: Mar. 25, 2008

(54) METHOD AND SYSTEM FOR EFFICIENT AND RELIABLE MAC-LAYER MULTICAST WIRELESS TRANSMISSIONS

(75) Inventors: Arup Acharya, Nanuet, NY (US); Archan Misra, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 10/996,078

(22) Filed: Nov. 23, 2004

(65) Prior Publication Data

US 2006/0109859 A1 May 25, 2006

(51) Int. Cl.
*H04L 12/28* (2006.01)
*H04B 7/005* (2006.01)
*H04J 3/16* (2006.01)

(52) U.S. Cl. .................. 370/254; 370/278; 370/468
(58) Field of Classification Search ................ 370/254, 370/278, 280, 282, 294, 321, 322, 326, 337, 370/347, 437, 442, 468
See application file for complete search history.

(56) References Cited

U.S. PATENT DOCUMENTS

| | | | |
|---|---|---|---|
| 5,436,905 A | 7/1995 | Li et al. ................ 370/95.2 |
| 6,026,082 A * | 2/2000 | Astrin .................... 370/336 |
| 6,490,256 B1 * | 12/2002 | Jones et al. ............. 370/277 |
| 6,556,582 B1 * | 4/2003 | Redi ...................... 370/443 |
| 6,577,609 B2 | 6/2003 | Sharony ................. 370/312 |
| 6,611,521 B1 * | 8/2003 | McKay et al. .......... 370/392 |
| 6,625,124 B1 | 9/2003 | Fan et al. ............... 370/235 |
| 6,934,297 B1 * | 8/2005 | Bensaou et al. ......... 370/445 |
| 7,095,715 B2 * | 8/2006 | Buckman et al. ....... 370/230 |
| 7,184,413 B2 * | 2/2007 | Beyer et al. ............ 370/254 |
| 2002/0054578 A1 * | 5/2002 | Zhang et al. ........... 370/328 |
| 2003/0026240 A1 | 2/2003 | Eyuboglu et al. ....... 370/349 |
| 2003/0035424 A1 | 2/2003 | Abdollahi et al. ....... 370/392 |
| 2003/0058886 A1 * | 3/2003 | Stanforth et al. ........ 370/468 |
| 2003/0133427 A1 * | 7/2003 | Cimini et al. ........... 370/338 |
| 2003/0177267 A1 | 9/2003 | Orava et al. ............ 709/245 |
| 2003/0207696 A1 | 11/2003 | Willengegger et al. .. 455/522 |
| 2003/0220119 A1 | 11/2003 | Terry ..................... 455/466 |
| 2003/0227934 A1 * | 12/2003 | White et al. ............ 370/432 |
| 2005/0002355 A1 * | 1/2005 | Takano .................. 370/329 |
| 2005/0169232 A1 * | 8/2005 | Sakoda et al. .......... 370/347 |

OTHER PUBLICATIONS

Tang et al. *MAC Reliable Broadcast in Ad Hoc Networks*, IEEE Milcom Oct. 2001, pp. 1009-1014.
Chaporkar et al., *An Adaptive Strategy for Maximizing Throughput in MAC Layer Wireless Multicast*, ACM Mobihoc 2004 pp. 256-267, Tokyo, Japan, May 24-26, 2004.
Joy Kuri et al., *Relaible Mutlicast in Multi-access Wireless LANs*, IEEE Infocom Mar. 1999, pp. 760-767.

* cited by examiner

*Primary Examiner*—Wing Chan
*Assistant Examiner*—Hong Sol Cho
(74) *Attorney, Agent, or Firm*—F. Chau & Associates, LLC (57) ABSTRACT

A method and system for reliable multicasting on a communication network includes sending Request-to-Send (RTS) signals from a sender node of the network to the receiver nodes, the RTS signals include a set of identifiers corresponding to the receiver nodes. The Clear-to-Send (CTS) signals and Acknowledgment (ACK) signals are sent from the receiver nodes according to an ordering function of the set of identifiers.

14 Claims, 6 Drawing Sheets

FIG. 1

802.11 DCF MAC
(PRIOR ART)

METHOD AND SYSTEM FOR EFFICIENT AND RELIABLE MAC-LAYER MULTICAST WIRELESS TRANSMISSIONS

TECHNICAL FIELD

The present invention is directed to the field of computer networks. It is more particularly directed to medium access schemes for Wireless Local Area Networks (WLANs) and multi-hop wireless (mesh) networks.

DISCUSSION OF THE RELATED ART

Advances in the field of computer networking have enabled a vast area of applications that share information and resources between computers spread over a small or large geographical area. Various networking protocols and network topologies have been developed. With the advent of wireless networking, newer protocol families have gained prominence. For example, the IEEE 802.11 protocols for wireless networking have become popular.

While the higher-level wireless networking protocols have evolved, there are only a few practical solutions for reliable multicasting at the Media Access Control (MAC) layer in the 802.11 networks. In particular, the existing approaches rely on the higher-level protocols, rather than a lower layer MAC protocol, to provide an acknowledgement for a received packet. But this approach typically involves additional channel accesses, and hence reduces the network throughput and increases the complexity of the network software.

Hence, there is a need for a lower-level protocol that provides acknowledgement for received packets and increases the throughput of the network.

Existing approaches for multicasting over wireless networks are considered next. One such approach groups packets and nodes into tuples, while relying on higher-level protocols to filter out the messages to individual recipient nodes. For example, U.S. Pat. No. 6,577,609 to Sharony describes a system where a multicasting address is associated with two or more recipient nodes' MAC addresses. This approach is discussed next.

A transmitter in a network combines two unicast packets that are addressed to two nodes with different MAC addresses into a single multicast MAC transmission having a multicasting address. The recipient nodes with two different MAC addresses receive the combined multicast packet where the data part includes a tuple having both the MAC addresses and the data packets. The recipient nodes rely on higher layer protocols to filter out messages to the individual MAC addresses of the nodes. This approach does not provide any mechanism for recipient nodes to send acknowledgments for received packets, and hence make the multicasting process unreliable.

There are few known solutions for reliable multicasting on the 802.11 at the MAC level. However, the known 802.11 multicasting approaches do not offer reliable delivery since there is no MAC level mechanism for the receivers to send acknowledgements for the received packets.

One approach that uses shorter addresses (with only local scope) instead of a unique MAC address to reduce the overhead is discussed next. For example, U.S. Pat. No. 6,625,124 to Fan et al. discusses a technique for automatic reconfiguration of such shorter addresses that are unique within a virtual network (e.g., every one-hop neighborhood). However, this approach focuses on unicast transmissions from one transmitter to a uniquely identified recipient node.

Another approach uses multicast address groups as a destination indicator in air link frames. For example, the Patent Application Pub. No. 20030026240 (M. Eyuboglu) is directed to cellular standards such as IS-856, a high-speed wireless packet based standard for the emerging 3G networks. In a cellular environment, there are potentially dedicated channels for each transmitter to receiver link. The Eyuboglu disclosure focuses on how the multicast packet is repeatedly unicast over each such link, to each intended recipient, using IS-856 specific signaling parameters. Alternatively, the multicast packet is sent over a common broadcast channel to avoid the unicast overhead.

SUMMARY

In one aspect of the invention, a method for reliable multicasting on a communication network operating at the MAC layer includes sending Request-to-Send (RTS) signals from a sender node of the network to the receiver nodes, the RTS signals include a set of identifiers corresponding to the receiver nodes. The Clear-to-Send (CTS) signals and Acknowledgment (ACK) signals are sent from the receiver nodes according to an ordering function of the set of identifiers. The ACK signals are sent after a data packet is received correctly.

In an another aspect of the invention, the identifiers sent with the RTS signals are labels or bit vectors. Multicasting iteration is performed till all packets are correctly transmitted. In yet another aspect of the invention, a device to perform the multicasting technique is disclosed.

BRIEF DESCRIPTION OF THE DRAWINGS

Exemplary embodiments of the invention are described with reference to the accompanying drawings, of which:

FIG. 3 shows a timing sequence for multicasting that uses a bit-vector in an exemplary embodiment of the invention;

DETAILED DESCRIPTION OF EXEMPLARY EMBODIMENTS

Figure 1:
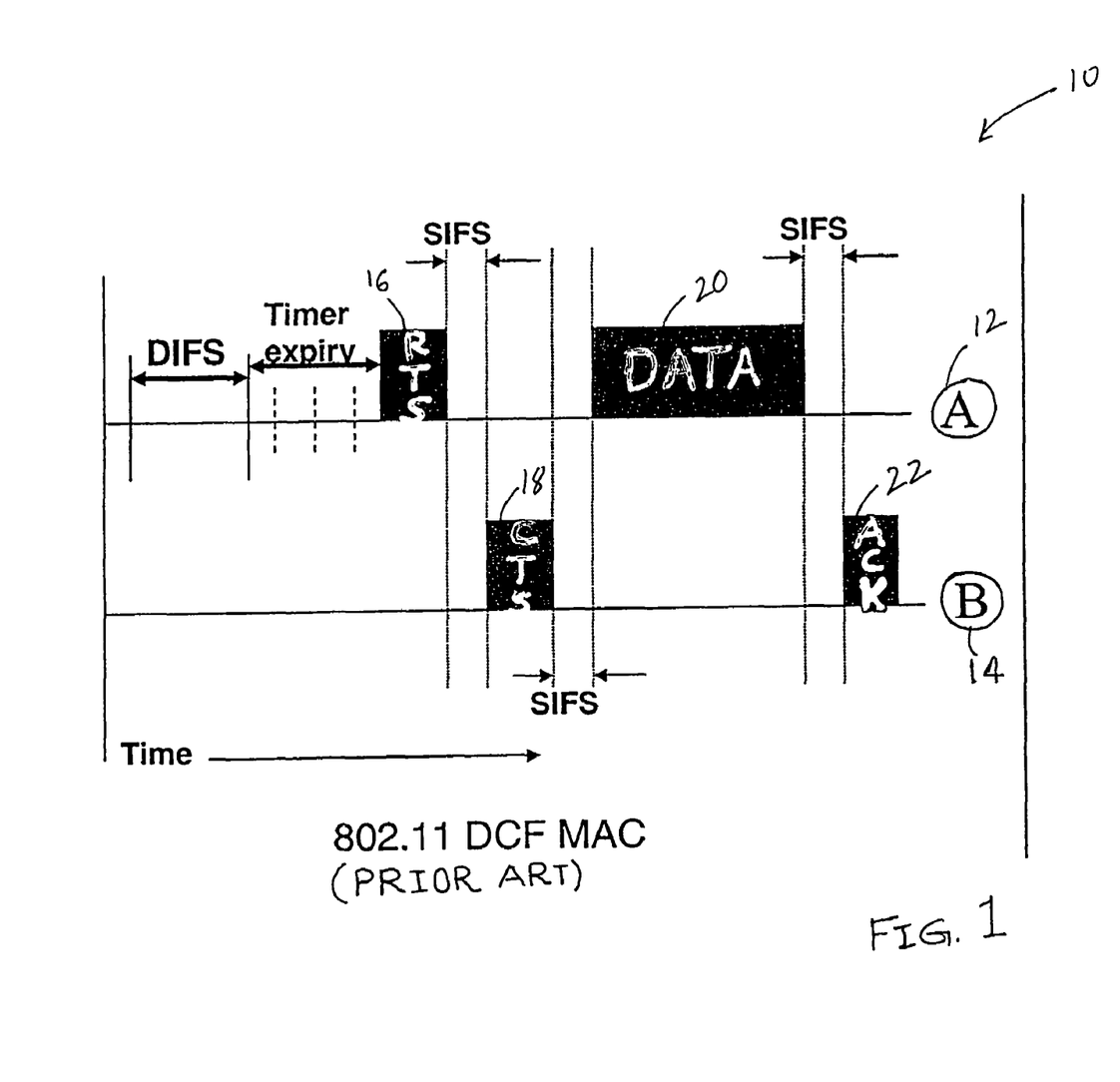
FIG. 1 shows a representation of a conventional four-way handshake arrangement as used in the 802.11 protocols.

Exemplary embodiments of the invention are described with reference to the accompanying drawings, of which:

FIG. 1 shows a representation of a conventional four-way handshake arrangement as used in the 802.11 protocols. Timing Diagram 10 illustrates 802.11 MAC layer Distributed Coordination Function (DCF) using exemplary nodes 12 and 14 (labeled as "A" and "B").

In a typical computer network, several nodes may try to send data at the same time leading to packet collisions and channel congestion. One technique used by various communication protocols to deal with packet collision is the Collision Sense Multiple Access (CSMA), which is typically applied as the CSMA/Collision Detection (CSMA/CD) or the CSMA/Collision Avoidance (CSMA/CA) scheme. Both, CSMA/CD and CSMA/CA, are types of contention protocols where the nodes compete for the availability of the channel to transmit data over a network channel.

The CSMA/CA protocol works by having a network node intending to transmit a packet of information first listen to the network channel to determine if it is safe to transmit data. The 802.11 contention resolution and access control mechanism is based on the Carrier-Sense Multiple-Access with Collision Avoidance (CSMA/CA) algorithm, which consists of two distinct steps:

a) A node interested in sending an IP packet first senses the channel to see if the channel is idle. If the channel is busy, i.e., some activity from a neighboring node is detected, and then the node backs off and idles for a period before retrying.

b) On sensing an idle channel, the node transfers data to the neighboring recipient using a four-way handshake mechanism for reliable and contention-free packet delivery.

The 802.11 protocol's DCF in the form of a four-way handshake is described next:

1. Node 12 ("A") sends a RTS (request-to-send) signal 16 to the node 14 ("B"), effectively informing anyone within A's neighborhood that the medium is "reserved" for the duration $T_{RTS}$.
2. Node 14 sends a CTS (clear-to-send) signal 18 to the node 12, specifying the time interval $T_{CTS}$ during which the node 12 is permitted to send the data. The CTS signal 18 informs all neighbors of the node 14 that the channel is reserved for the duration $T_{CTS}$.
3. Node 12 then sends a data packet 20 to the receiving node. This data transfer phase immediately follows the reception of the CTS signal 18.
4. On a successful reception of the data packet 20, the node 14 sends a final data ACK (Acknowledgement) signal 22.

The RTS, CTS and ACK signals are part of the MAC layer's operation.

Figure 2:
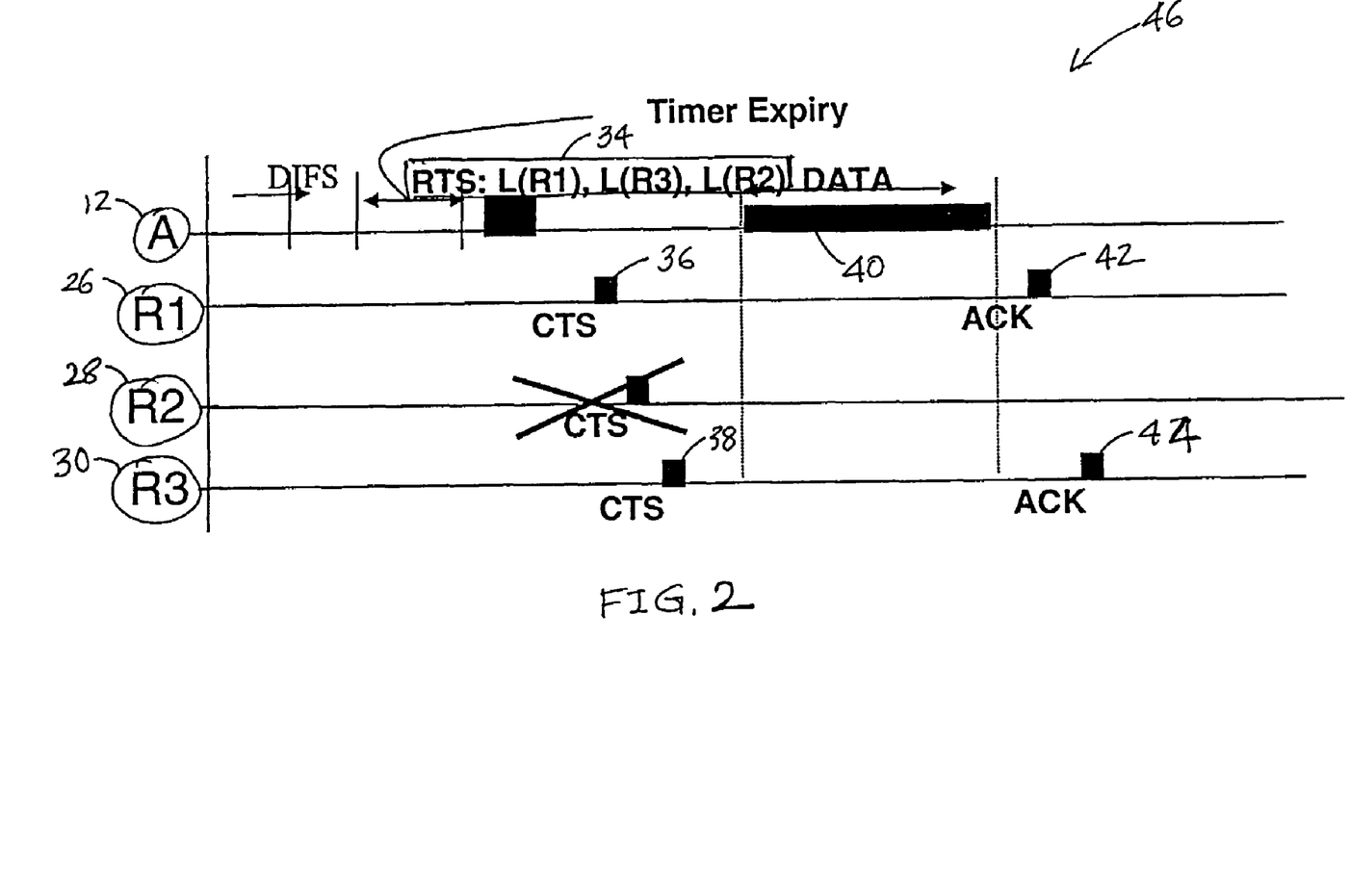
FIG. 2 shows a timing sequence for multicasting that uses short labels in an exemplary embodiment of the invention.

FIG. 2 shows a timing sequence for multicasting using short labels in an exemplary embodiment of the invention. A timing diagram 24 shows the representations of the exemplary nodes 12, 26 ("R1"), 28 ("R2"), 30 ("R3"). A packet of data is to be multicasted from the node 12 to the nodes 26, 28 and 30. Node 12 sends the sequence of labels L(R1), L(R2) and L(R3) in a RTS signal 34 in the form of a label-vector.

The RTS signal 34 sent to the recipient nodes includes a label vector with label indicators. The labels are short identifiers that uniquely identify the receiving nodes. The order of recipient nodes in the label vector also determines the order in which the recipient nodes respond with their CTS and ACK messages. In the present illustration, the RTS sent from the node 12 includes the label vector that specifies the order of recipients as first the node 26 and then the node 30. Hence, following this order, the ACK signal 42 was received first (in the 1$^{st}$ ACK time-slot) from the node 26 and then the ACK signal 44 from the node 30.

In general, the label L(.) need not be restricted to a one-hop unique identifier, but may be any identifier that is unique (whether globally or locally). For example, L(R1) may simply equal R1, the MAC address of the receiver R1, and so on. In one exemplary embodiment, one hop neighbor nodes are identified using short labels L(R1), L(R2), L(R3) and L(R4) that have only a local scope. These short labels uniquely identify each neighbor of a transmitting node. For N one-hop neighbors only a log(N) bit size label is required to ensure the uniqueness of the label. Using the short labels to identify the one-hop neighbor nodes avoids the need to identify each one-hop neighbor with its full MAC address. Unlike the MAC addresses, the labels are unique only from the perspective of the sender. Hence, the same label can be reused in the nodes that are two-hop away.

The recipient nodes send back the CTS signals to the sending/transmitting node depending upon their availability to accept the transmission of the data-packet. The transmitting node then sends the data packet if at least one node has responded back with a CTS. In the present example, nodes 26 and 30 respond with the CTS signals 36 and 38 in the 1$^{st}$ and 3$^{rd}$ time-slots.

The CTS signals are sent back in an order that is a function of the sequence in which their addresses, i.e., labels were specified in the RTS label-vector. For example, the receiving nodes could respond back with CTS signals in the same sequence in which the labels appeared in the label-vector sent with the RTS. Further, the CTS signals can be sent back in an order that is a pre-defined mathematical function of the sequence of the labels in the RTS label-vector.

As the size and duration of each CTS transmission is fixed by a protocol standard, each receiving node can correctly and independently compute the time by which it needs to stagger the CTS transmission. This staggering technique ensures that no two receivers collide with each other when sending the CTS signals. Thus, the sender node can correctly deduce which subset of receiving target nodes have indicated their availability based upon the received CTS signals.

Node 28 does not respond because its NAV (Network Allocation Vector) entry prohibits it from responding at the given instant. The NAV is maintained under the IEEE 802.11 protocol to monitor the state of the channel. After receiving the CTS signals 36 and 38, the node 12 sends a data packet 40 to the nodes 26 and 30 that had sent the CTS signals 36 and 38. Nodes 36 and 38 send back ACK signals 42 and 44 in the 1$^{st}$ and 3$^{rd}$ slot for ACK responses.

The receiving nodes send back the ACK signals in an order that is a function of the order of the labels in the label-vector. The function can be a simple one to one mapping or a mathematical function. The receiving nodes that did not receive the data packet 40 correctly will not send back an ACK signal. Sender can then determine based on absence of ACK signals from the receiving nodes as to which nodes did not receive the packet correctly. The RTS signal, CTS signal and the ACK signal can be used as packets to transmit the signals.

Reliable delivery service over a wireless (mesh) network is made possible by the receiving nodes sending back acknowledgements in the order specified by the label vector in the RTS signals. The network's performance efficiency is enhanced by providing reliable delivery service at the MAC layer. Hence, the need to use higher layer protocols to provide reliable service is minimized.

FIG. 3 shows a timing sequence for multicasting using a bit-vector in an exemplary embodiment of the invention. The labels for nodes can be replaced with N bits, where N is the number of neighbors of the sending node. All the neighbors of the source are indexed such that each neighbor knows its position in this "neighborhood index/list".

The source node then sends a RTS packet as a vector of bits ("bit-vector") with each bit in the bit-vector indicating the corresponding recipient node in the neighborhood index. In the present example, the node 12 is the source node and the nodes 26, 28 and 30 are recipient nodes. Each one of the recipient nodes has a unique bit index in the neighborhood index. A bit-vector with entries for the recipient nodes 26, 28 and 30 is sent along with the RTS signal 34. The i th position in the bit-vector of the RTS signal 34 that contains the bit pattern "1011" indicates the i th neighbor of the sender node.

The receiving nodes 26 and 30 send back the CTS signals 36 and 38 to indicate their willingness to accept the data packet 40. Node 12 sends the data-packet 40 to the nodes that sent the CTS signals, i.e., the nodes 26 and 30, which after receiving the data-packet 40 send back the ACK signals 42 and 44.

The bit vector indexing technique provides an effective addressing process when the number of neighbor nodes is relatively high and the multicast group is dense, i.e., the packet is targeted to a relatively large subset of the entire set of receiving nodes.

Many basic aspects of the 802.11 standard are left unchanged in an exemplary embodiment of the invention. For example, the sender node is allowed to send the initial RTS signal only if its entry in the NAV is empty. The NAV tracks the time for which the channel is reserved. Accordingly, if the node 28 was actually receiving a packet from some other sender node (S1, not shown), then the node 28's CTS would have caused node 12's NAV to be updated. As a result, the node 12 would have been blocked from sending its RTS until the 4-way handshake between S1 and the node 28 had completed. The details of the 802.11 MAC, such as the backoff mechanism for contention resolution are left unchanged. The 802.11 protocol is used as an illustration, and any other network protocol can also be used.

Figure 4:
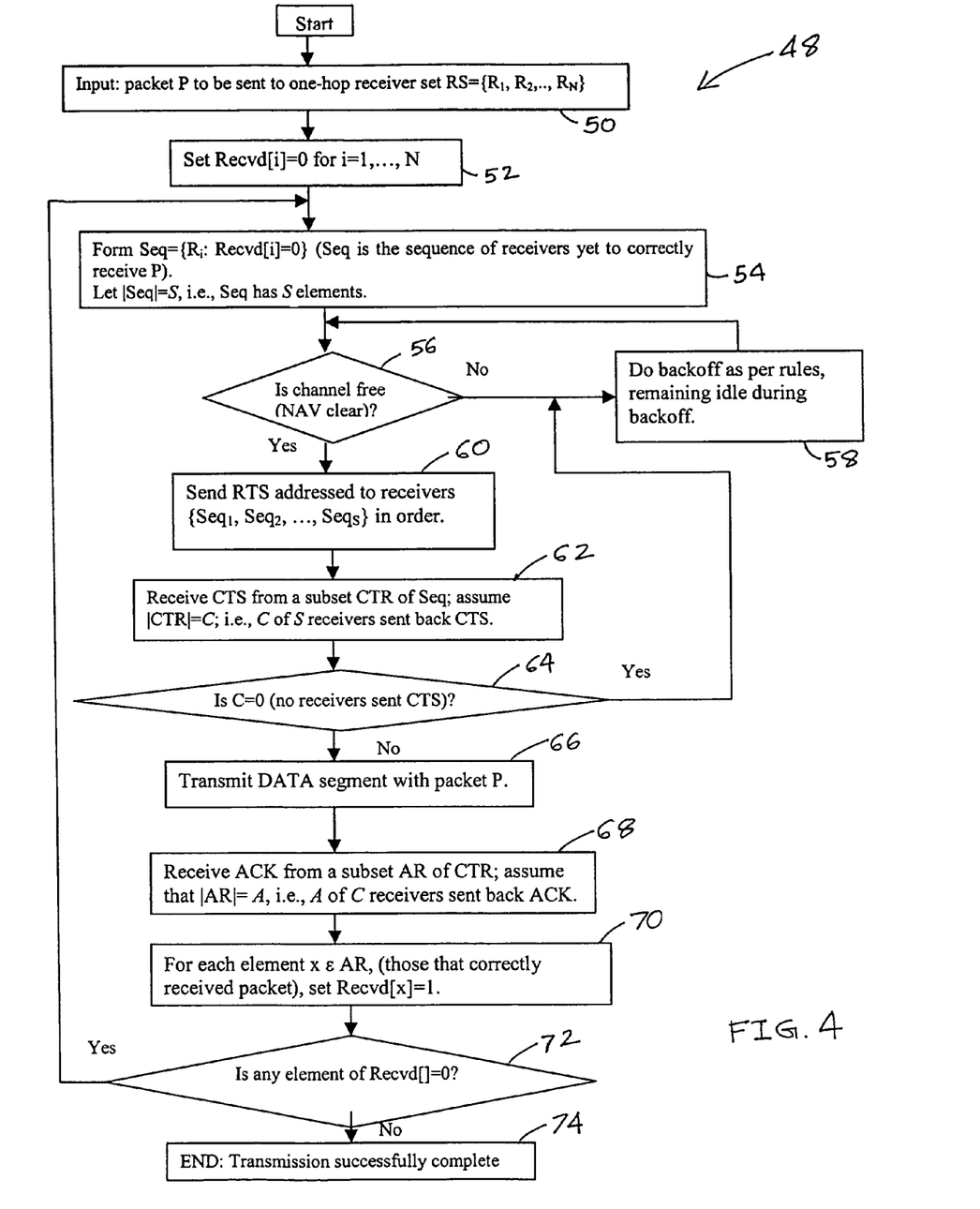
FIG. 4 is a flowchart for a multicast sending procedure in an exemplary embodiment of the invention.

FIG. 4 is a flowchart for a multicast sending procedure in an exemplary embodiment of the invention. Flowchart 48 starts at a step 50 where an input data packet P is received at a MAC layer of the network node. The packet P can be sent to a set of one-hop receiver nodes indicated by the set $RS=\{R_1, R_2, \ldots R_N\}$. This set can include any number of receiver nodes in the network.

At a step 52, a vector Recvd[i] is initialized that stores the status of the acknowledgments received indicating correct and successful transmission of a packet. The vector Recvd[i] is used as a loop counter to continue process iteration till all packets are transmitted successfully. At a step 54, a Seq{$R_i$: Recvd[i]=0} where Seq {}is a sequence of receiver nodes yet to correctly receive the current packet P is stored. Seq {}is assumed to have S elements.

At step 56 if the NAV is clear, i.e., the network channel is available then a RTS signal is sent to all receivers in the order specified by the {$Seq_1, Seq_2, \ldots, Seq_s$} sequence or a function of the sequence's order. However, if the NAV is not clear then as per the network protocol backoff with idling is performed at the step 58.

A subset of Seq {}receivers indicated by CTR are the receivers that sent CTS signals at a step 62. Then at a step 64 if no receivers have sent the CTS signal then the control proceeds to a step 58 to perform a backoff and idling procedure. However, if even one or more receiver nodes have sent the CTS signals to the sender node then the current data packet P is transmitted to the nodes that sent back the CTS signal as shown at a step 66. A step 68 shows that the ACK acknowledgement signals are received from a subset of receiver nodes that had sent back the CTS signals.

At a step 70, the Recvd []vector is updated for all the receiver nodes that sent back the ACK signal indicating that they correctly received the data packet P. The whole process iterates at a step 72 to return to the step 54 if any receiver nodes that had sent the CTS signals have not received the data packet P correctly. The transmission process ends at step 74 when the multicasting to all receiver nodes in the multicast set RS is complete.

Figure 5:
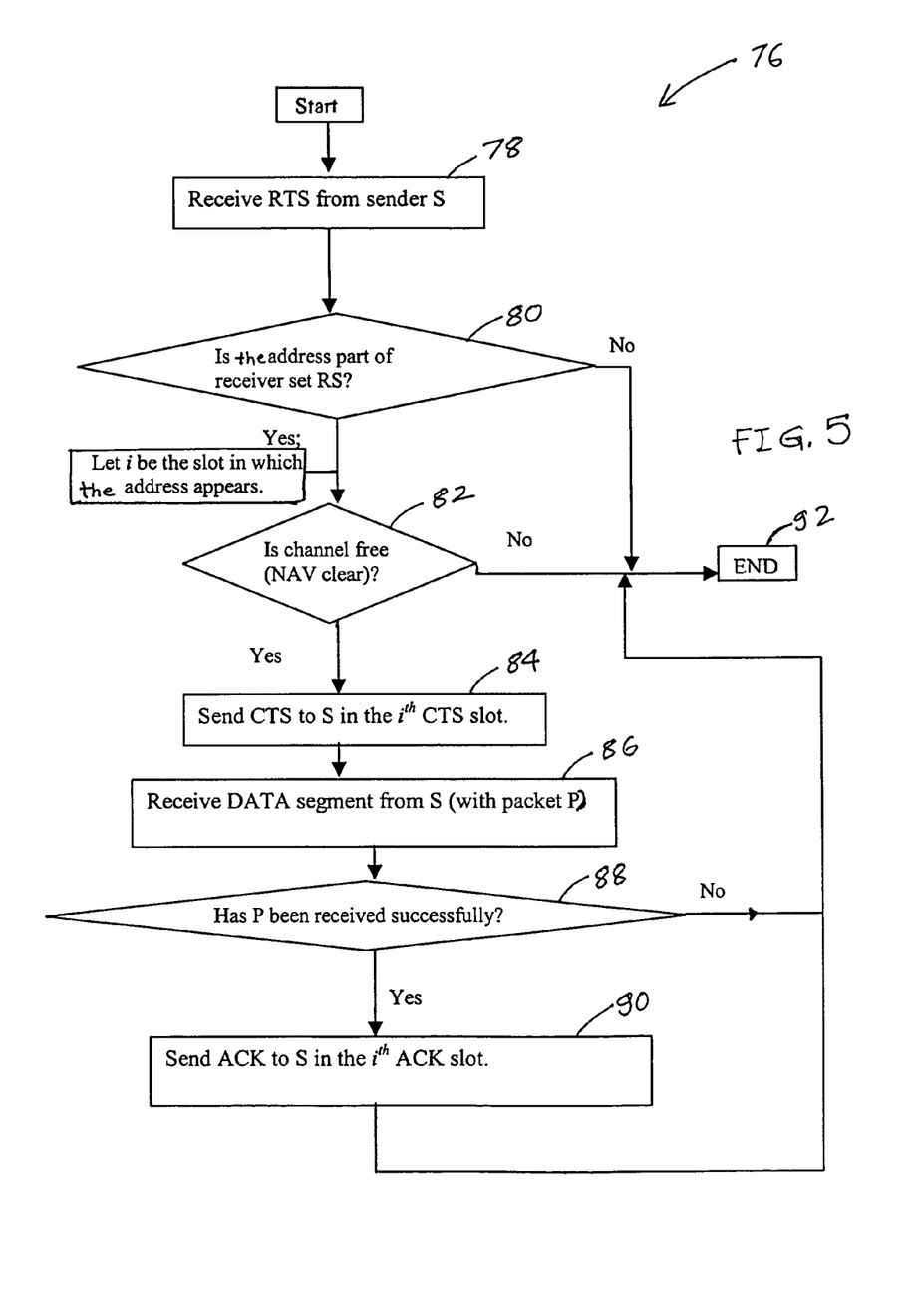
FIG. 5 is a flowchart for a multicast receiving procedure in an exemplary embodiment of the invention.

FIG. 5 is a flowchart for a multicast receiving procedure in an exemplary embodiment of the invention. Flowchart 76 shows the process of multicasting from a perspective of a receiver node. At a step 78, a RTS signal is received from a sender node S. The received RTS signal will contain one of a label vector, a bit vector or a vector with receiver flags as a receiver set. At step 80 the receiver node checks the label vector to determine if its address, i.e., its label or bit identifier, is a part of the receiver set. If the receiver node is not a part of the receiver set in the RTS signal then receiving process at the current receiver node ends at a step 92.

If the current receiver node is a part of the receiver set then it determines the position in the receiver set (assumed as i). At a step 84, the receiver node determines the status of the network channel through the NAV. If the channel is not free then the process ends at the step 92. However, if the channel is free (i.e., available) the receiver node sends a CTS signal in the $i^{th}$ slot for sending a CTS signal as shown at a step 86.

The receiver node receives the data packet P after the CTS signal is sent. The receiver node checks if the data packet P was received correctly at a step 88. If the data packet was not received correct then the process ends at the step 92. If the data packet was received correctly, then an ACK signal is sent to indicate successful receipt of the data packet at a step 90, and then the receiving process ends at the step 92.

The order of sending the CTS signal and the ACK signal is the same as determined by the position of the receiver node in the receiver set, i.e., the label vector, bit vector or other vector. However, different orders can be followed.

In at least one exemplary embodiment of the invention, a special per-packet vector in a sender node's MAC card is used to ensure reliable delivery of the packet to all the intended recipient nodes. Any packet P at the sender node is associated with a vector, where each element of the vector corresponds to a single intended recipient. Before the first transmission is initiated, all the elements of the vector are set to a "NOT_RECEIVED" status. Once a set of recipient nodes indicates that they have correctly received the packet, the source node sets the corresponding vector elements to a "RECEIVED" status. The source node then subsequently restricts the packet retransmission only to those receivers that still have the vector element set to a "NOT_RECEIVED" status. By iterating over this process, the sender node can eventually ensure that all the elements of the vector have the value RECEIVED, which then indicates that all the recipient nodes received the data packet correctly. At this stage, the source node can discard the data packet.

In at least one exemplary embodiment, additional policies for multicasting can be implemented. For example, the source node can stop retransmission attempts after a certain number of retries, or after a certain fraction of the recipients have correctly received their packets. This policy will restrict the source node continuously attempting to retransmit. Those skilled in the art will appreciate that multiple policies can be applied either singly or in combination depending upon the user's requirements.

Figure 6:
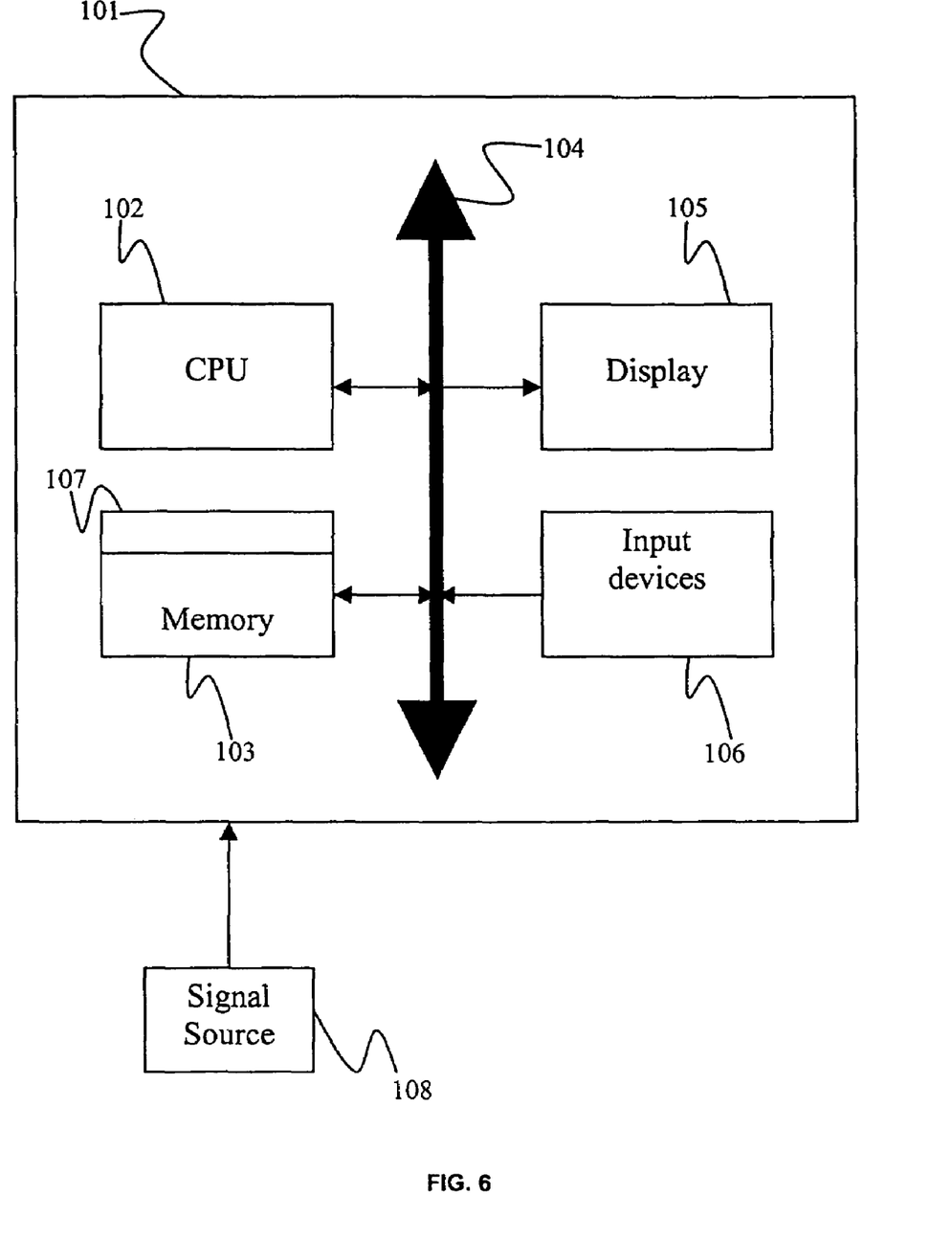
FIG. 6 is a computer system used in an exemplary embodiment of the invention.

Referring to FIG. 6, according to an exemplary embodiment of the invention, a computer system 101 for implementing the exemplary embodiment can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. At least one embodiment of the present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which an exemplary embodiment of the present invention is programmed. Given the teachings of the exemplary embodiments present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for reliable multicasting on a communication network, the method comprising:
    sending one or more Request-to-Send (RTS) signals from a sender node of the network to one or more receiver nodes of the network, the RTS signals including a set of identifiers corresponding to the receiver nodes;
    sending one or more Clear-to-Send (CTS) signals from one or more of the receiver nodes according to an ordering function of the set of identifiers;
    sending a data packet from the sender node to the receiver nodes;
    sending one or more Acknowledgment (ACK) signals from one or more of the receiver nodes receiving the data packet to the sender node according to an ordering function of the set of identifiers;
    determining from the one or more CTS signals and the one or more ACK signals received by the sender node whether any of the receiver nodes did not receive the data packet correctly; and
    multicasting the data packet from the sender node to the one or more receiver nodes that did not correctly receive the data packet.

2. The method of claim 1 wherein the set of identifiers comprising:
    a plurality of Media Access Layer (MAC) addresses corresponding to the receiver nodes.

3. The method of claim 1, wherein the set of identifiers comprising:
    a plurality of locally unique labels addressing each of the receiver nodes.

4. The method of claim 3, wherein the locally unique labels are shorter than a full MAC (Media Access Control) network address of each of the receiver nodes.

5. The method of claim 1, wherein the set of identifiers comprising:
    a plurality of binary bits addressing each of the receiver nodes, wherein the binary bits are shorter than a full MAC (Media Access Control) network address of each of the receiver nodes.

6. The method of claim 1, wherein the RTS signals comprising a plurality of RTS packets, the CTS signals comprising a plurality of CTS packets and the ACK signals comprising a plurality of ACK packets.

7. The method of claim 1, wherein the ordering function of the set of identifiers follows the sequential position of the identifiers in the set of identifiers.

8. The method of claim 1, wherein the ordering function of the set of identifiers is a mathematical function applied to the sequential position of the identifiers in the set of identifiers.

9. The method of claim 1, wherein sending the RTS signal further comprises:
    creating a neighborhood list comprising indexes of the receiving nodes that are at a one-hop distance from the source node, wherein the set of identifiers comprising the indexes of the receiving nodes listed in the neighborhood list.

10. The method of claim 9, wherein each of the receiving nodes listed in the neighborhood list storing its index position in the neighborhood list to determine when and if to send the CTS signal and the ACK signal.

11. The method of claim 1, wherein sending the CTS signals and the ACK signals follow the sequence of the identifiers in the set of identifiers.

12. The method of claim 1, wherein the sender node and the receiving nodes comprise a wireless network.

13. The method of claim 12, wherein the wireless network operating on a IEEE 802.11 protocol.

14. The method of claim 1, wherein the RTS signals, the CTS signals and the ACK signals are part of a MAC (Media Access Control) layer protocol operating on the sender node and the receiving nodes.

* * * * *